Feb. 11, 1969  R. C. ABT ET AL  3,427,239
TOOL ELECTRODE FOR ELECTRO-EROSIVE MACHINERY
Filed April 11, 1966

INVENTORS
Ronald C. Abt
Robert R. Adams
BY
ATTORNEYS

United States Patent Office
3,427,239
Patented Feb. 11, 1969

3,427,239
TOOL ELECTRODE FOR ELECTRO-EROSIVE MACHINERY
Ronald C. Abt and Robert R. Adams, Cincinnati, Ohio, assignors to The Cincinnati Milling Machine Co., Cincinnati, Ohio, a corporation of Ohio
Filed Apr. 11, 1966, Ser. No. 541,638
U.S. Cl. 204—284
Int. Cl. B01k 3/04; C23b 57/74
3 Claims

ABSTRACT OF THE DISCLOSURE

There is described herein a tool electrode for use in the electro-chemical machining process which has a narrow rim extending forward of its machining face and around the periphery thereof to produce a high resistance to flow. This tool produces smoothly machined surfaces on through holes which do not have the electrolyte flow lines that frequently are objectionable in a part machined by the electro-chemical process.

---

Rapid electrolytic erosion of conductive workpieces, commonly called electro-chemical machining, has become an accepted and relatively common process in the metal working art, particularly as applied in the cutting and shaping of hard and tough metal alloys that are not economically cut by the traditional chip producing metal cutting processes. As the technology of this electro-chemical process has continued to become more sophisticated, some problems resulting from uneven flow of electrolyte have been encountered which have caused a slowing of its acceptance to a wider range of application. One problem is the inability to provide an electrode from which electrolyte can be supplied to the eroding work in a smooth and uniform manner which will eliminate flow lines and patterns in the surfaces machined. Another problem arising in the process is the formation of a radius around a hole both on the entry and the exit sides thereof so that relatively sharp edges cannot be produced without subsequent lapping or other treating of surfaces of the work. The process also always results in an overcut, that is, a difference in size between a tool and a hole produced by that tool since a small gap between the tool and work is inherent in the process. It is difficult to control this overcut without some irregularity in it during machining since the flow of electrolyte cannot be controlled as closely as desired and therefore holes are not produced to tolerances acceptable for all applications.

It is therefore an object of this invention to provide a tool electrode for the electro-chemical machining process which facilitates a very smooth and even flow of electrolyte outward therefrom to better control entry and exit radii and to overcome the disadvantages resulting from uneven flow patterns which heretofore have been accepted as inherent in the process.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

The present invention is an end face cutting type electrode intended for forward electrolyte flow, that is, out from the end face of the electrode and into the overcut gap between the electrode and work. The end face of the electrode is of such a configuration that the highest resistance to electrolyte flow occurs at a very small area just at the peripheral edge of the end face of the tool. This flow restriction or resistance is provided at the peripheral edge of the tool face by causing the electrolyte to change direction of flow at least three times in a very short distance and these changes of direction are caused by the use of a narrow step or rim that extends forward in the direction of tool feed and completely around the periphery of electrode tool face. A second restriction is provided at the center of the electrode tool face that is of substantial resistance but less than the peripheral resistance described and the electrolyte is supplied to the tool face through this second restriction from a supply manifold formed inside the tool.

A clear understanding of the construction of an electrode as provided by this invention can be obtained from the following detailed description in which reference is made to the attached drawings wherein.

Figure 5:
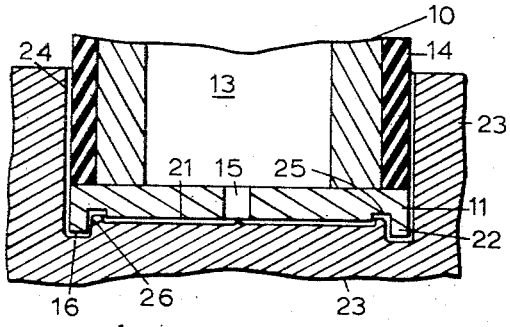
FIG. 5 is a view similar to FIG. 4 wherein an alternate configuration of the end face of the electrode is shown.

The electrode or tool shown in the specific example of FIGS. 1–4 is adapted for the production of a kidney-shaped hole through a workpiece wherein the finish on the wall of the hole must be free of electrolyte flow lines and which must be held in size within close tolerances. The tool has an electrically conductive shank portion 10 which extends axially back from a face plate 11 that is secured on the forward end of the shank by means such as silver soldering so that it forms an integral part of the tool. The rearward end of the tool (not shown) is adapted to be secured to a source of direct current electrical power and the sliding head or ram of an electro-chemical machining mechanism in a conventional manner. The shank 10 is also adapted at its rearward end for connection to a source of electrolyte under pressure at the ram which causes the electrolyte to be introduced under pressure into a series of channels 12 extending axially through the shank 10 to a manifold space 13 that is provided in the forward end of the shank 10 behind the face plate 11. The external surfaces of the shank 10, behind the face plate 11 are covered by a layer of electrical insulation 14. For deep hole machining applications, the insulation 14 may be relieved behind the face plate, that is, the cross section of the shank 10 and insulation 14 will be less than the area of the face plate 11 to reduce the restrictive effect on fluid flowing away from the forward end of the tool.

Figure 4:
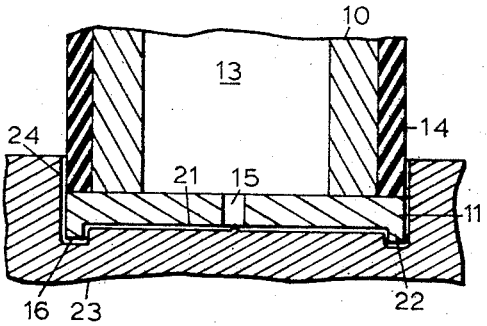
FIG. 4 is a cross section view of the electrode on the same reference line as FIG. 3 but with the electrode shown positioned in a workpiece as during a cutting operation.
Figure 3:
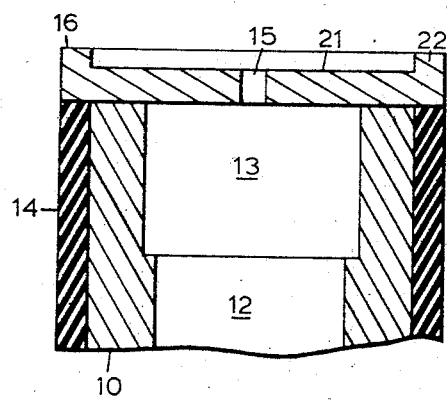
FIG. 3 is a cross section view of the electrode as viewed from line 3—3 of FIG. 2.
Figure 2:
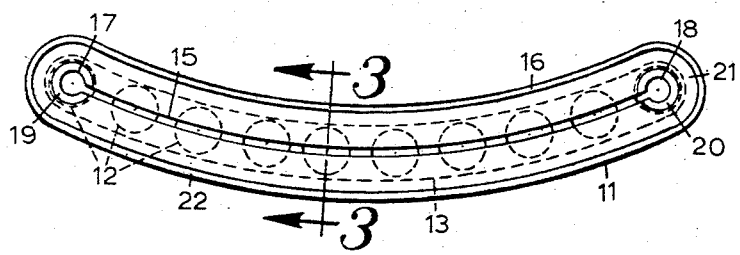
FIG. 2 is an end view in elevation of the forward or cutting face of the electrode shown in FIG. 1.
Figure 1:
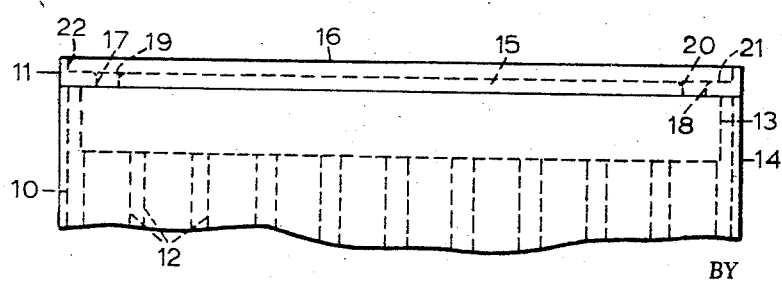
FIG. 1 is a side view in elevation of the forward end of an electro-chemical machining electrode.

The face plate 11 is provided with a narrow slot 15 that extends centrally therealong to provide an opening through which electrolyte from the manifold space 13 can be passed to the forward end or cutting face 16 of the tool. The slot 15 is terminated at each end by intersection with a round hole 17, 18. Each of the holes 17, 18 has a diameter greater than the width of the slot 15 and has its outer edge of intersection with the end face broken by a chamfer or radius 19, 20. It is the purpose of these holes 17, 18 to provide a smoothly spreading flow of electrolyte directed outward toward the rounded ends of the cutting face 16 during a cutting operation. As shown, the end face 16 has a planar area 21 extending over the major portion thereof which is bounded by a narrow rim 22 that extends forward from the end face 16 around the extreme periphery thereof to provide a stepped contour which is presented directly toward a workpiece 23 (FIG. 4). The rim 22 is shown in the drawings in a slightly enlarged proportion for ease of illustration. In actual dimensions, it would be in the range of about .007 to .010 in elevation ahead of the planar surface 21 and would be about .020 inch or slightly less in width.

The action of the tool is best illustrated in FIG. 4 where its forward end is shown in position during an operation to produce a kidney-shaped hole 24 through the workpiece 23. Electrolyte under pressure passes at a high velocity through the slot 15 where it is directed against the workpiece 23 causing it to turn outward 90 degrees toward the periphery of the tool and the rim 22. It passes through the space between the work 23 and the planar face 21. The electrolyte is directed against the rim 22 where it is first turned axially forward for a short distance before being turned outward and away from the tool center once again. Finally, it is turned and directed axially rearward along the periphery of the tool. Thus, in flowing around the rim 22, the electrolyte must flow around three corners each of which requires a 90 degree change in direction. The resistance to flow presented by this flow pattern around the rim 22 is very high for the short distance involved and since it is present completely around the tool face 16, an extremely even flow of fluid has been found to result.

The effect of this high resistance around the periphery of the tool is to cause the space between the planar face 21 and the work 23 to act as a manifold so that a very small area of diverging flow is created just at the periphery. It is believed that a rapid divergence of flow in electro-chemical machining causes irregularities in flow. This is borne out by the application of reverse flow techniques where a pressure manifold is placed over the tool and work and the electrolyte passages of the tool are connected to low pressure or exhaust to provide smooth flow. This reverse flow apparatus is usually unwieldy and awkward as well as expensive due to the large area of work and tool that has to be enclosed and its avoidance is desirable. The confinement of the divergence to a very narrow rim area greatly reduces the flow irregularities and results in a very smooth finished hole surface. This is true even with tools having nicks and slight irregularities which, in tools having a completely plane face, would produce distinct flow lines that are not present in work produced by the tools of this invention. Since a relatively high flow resistance is present just at the periphery of the tool, small transient variations that occur locally around the tool to cause flow lines and irregularities in work surfaces have a much suppressed effect and improved surface finishes results. It has also been found that the tool produces another benefit in that its use greatly reduces the radius around the edge of a hole both on the entry and exit sides so that a much sharper edge is produced and overcut is maintained constant.

The tool shown in FIG. 5 is an alternate form of the tool of FIGS. 1–4 wherein the face plate 11 has been altered such that a channel 25 is formed around the planar area 21 inside and adjacent to the rim 22. This channel 25 is approximately the same in cross section dimensions as the cross section dimensions of the rim 22. Thus, fluid in moving from the space ahead of the planar face 21 is forced to turn two additional corners before moving around the rim 22 and an even greater resistance to flow is created resulting in the production of a very smooth hole surface. Since it is a characteristic of the process that machining rate is a function of spacing between tool and work, as the cutting operation proceeds, a rim 26 will be formed in the work 23, as shown, which will cause the electrolyte to move in a path requiring the two additional changes of direction before making the three turns in passing around the rim 22, except at the initial entry of the tool into the work.

What is claimed is:

1. In an electrode tool including a conductive shank portion externally covered with electrical insulation and a conductive face plate on the forward end thereof having a planar machining face for presentment adjacent to and movement through a workpiece in an electro-chemical machining operation, the combination comprising:
    (a) an electrolyte manifold space in said shank portion behind said face plate adapted to be maintained full of electrolyte under pressure,
    (b) passage means for transmitting electrolyte through the face plate to the central area of the machining face thereof, and
    (c) a narrow conductive rim around and adjacent to the peripheral edge of the machining face, said rim extending axially in advance of the machining face and having
        (1) a straight inside wall forming a sharp corner with the machining face and extending axially forward therefrom, and
        (2) a planar portion generally parallel to the machining face forming a sharp corner with the inside wall and extending laterally outward therefrom, said planar portion forming a further sharp corner at the peripheral edge thereof, whereby electrolyte flowing from the central area of the machining face negotiates at least three sharp corners around said rim prior to flow axially rearward along the periphery of the conductive face plate.

2. The electrode tool of claim 1 wherein a channel approximating the cross sectional dimensions of said rim is formed in the planar face inside said rim and immediately adjacent thereto to increase the peripheral restriction to electrolyte flow.

3. The electrode tool of claim 1 wherein the planar portion of said rim is axially advanced beyond the machining face by a dimension within the range of 0.007 to 0.010 inch and the lateral width is approximately 0.020 inch.

References Cited

UNITED STATES PATENTS

| | | | |
|---|---|---|---|
| 2,946,731 | 7/1960 | Falls | 204—143 |
| 3,058,895 | 10/1962 | Williams | 204—284 XR |
| 3,257,717 | 6/1966 | Wilkinson et al. | 204—224 XR |

JOHN H. MACK, *Primary Examiner.*

D. R. JORDAN, *Assistant Examiner.*

U.S. Cl. X.R.

204—143, 224